AUTOMATIC CLOSET LIGHT

Filed March 16, 1967 2 Sheets-Sheet 1

INVENTOR
Albon J. Lasseigne
Frank H. Marks
Nathan N. Kraus, Attys

AUTOMATIC CLOSET LIGHT

Filed March 16, 1967

INVENTOR
Albon J. Lasseigne
Frank H. Marks
Nathan A. Kraus, Attys

United States Patent Office 3,479,498

Patented Nov. 18, 1969

3,479,498

AUTOMATIC CLOSET LIGHT

Albon J. Lasseigne, Elgin, Ill., assignor to Sears, Roebuck and Co., Chicago, Ill., a corporation of New York Filed Mar. 16, 1967, Ser. No. 623,704
Int. Cl. F21v *33/00;* F21s *1/14*
U.S. Cl. 240—2 7 Claims

ABSTRACT OF THE DISCLOSURE

An automatic closet light as a compact unit adapted to be mounted on a door frmae for actuation by opening the door, the latter releasing a spring-loaded switch control member which moves to close an electrical illumination circuit. Reversely, on closing, the door acts on the switch control member to open the circuit. The unit has a small compact housing containing switch and wiring and one or more subhousings, each containing a lamp and reflector unit, swivelly mounted on the housing to permit manually directing the light where desired in the inclosure. The housing is preferably of molded non-conductive material.

My invention relates to automatic electrical illuminating devices for an inclosure having a door, such as a small room or closet, which will automatically become operative when the door is opened and be inoperative when the door is closed.

More particularly, my invention contemplates a compact unit suitable for mounting on a door frame adjacent a door, including a housing for a source of energy, such as one or more dry-cell batteries and appropriate electrical circuitry including said batteries, switch elements, etc., and, mounted on said housing, one or more electrical lamps which are adaptable to be angularly adjusted to throw their rays into the enclosure. Also mounted on the housing is a spring-biased switch control engageable with the door to maintain the lighting circuit open when the door is closed and operative, when the door is opened, to close the lighting circuit and thus illuminate the inclosure.

Another object of my invention is to provide a device of the type referred to which will be simple in construction, compact, rugged, inexpensive to fabricate and generally satisfactorily for the purpose desired.

My invention is adaptable to devices conveniently formed of a molded plastic, although not limited to such material.

Various other objects and advantages will suggest themselves to those skilled in the art as the description proceeds.

Referring now to the drawings forming a part of this specification and illustrating a preferred embodiment of my invention, FIG. 1 is a fragmentary elevational view showing part of a door frame and door hung therein, with a device embodying my invention mounted in the frame in position to be actuated by the door;

Figures 1, 2:
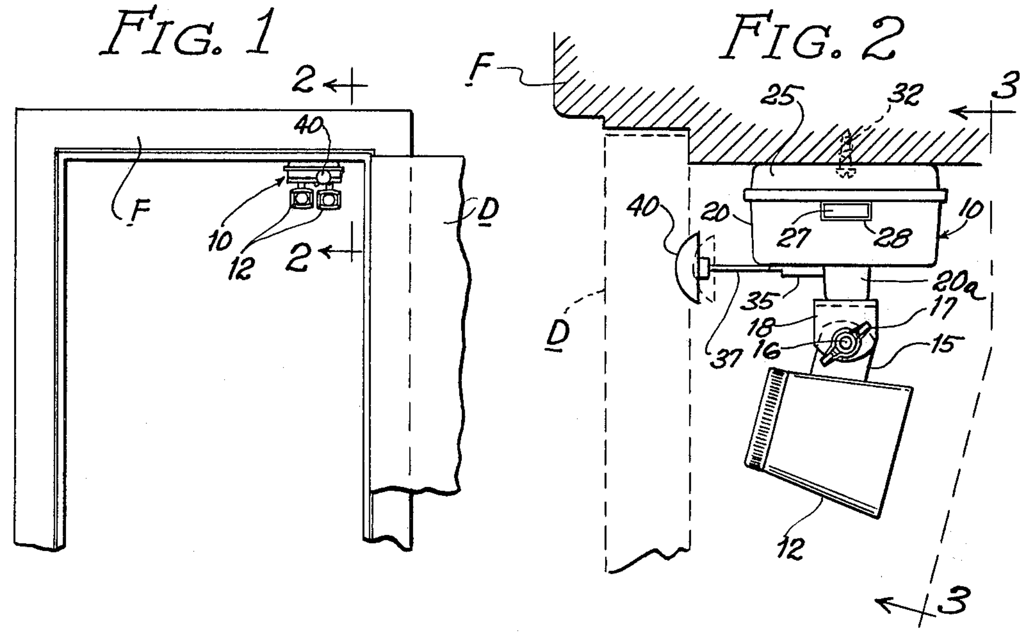
FIG. 2 is an elevational view, partly in section, on an enlarged scale, taken substantially along the line 2—2 of FIG. 1.
Figure 3:
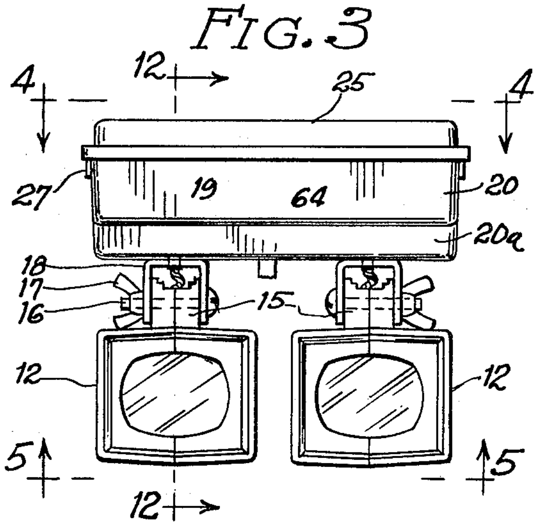
FIG. 3 is an elevational view, taken substantially along the line 3—3 of FIG. 2.
Figure 4:
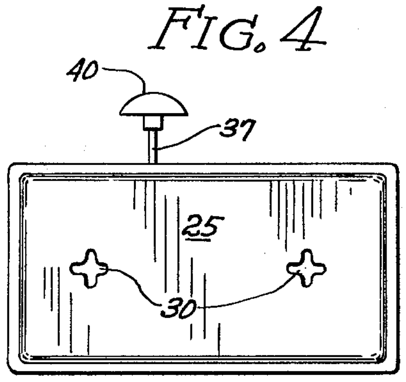
FIG. 4 is a plan view as seen substantially along the line 4—4 of FIG. 3.
Figures 5, 6:
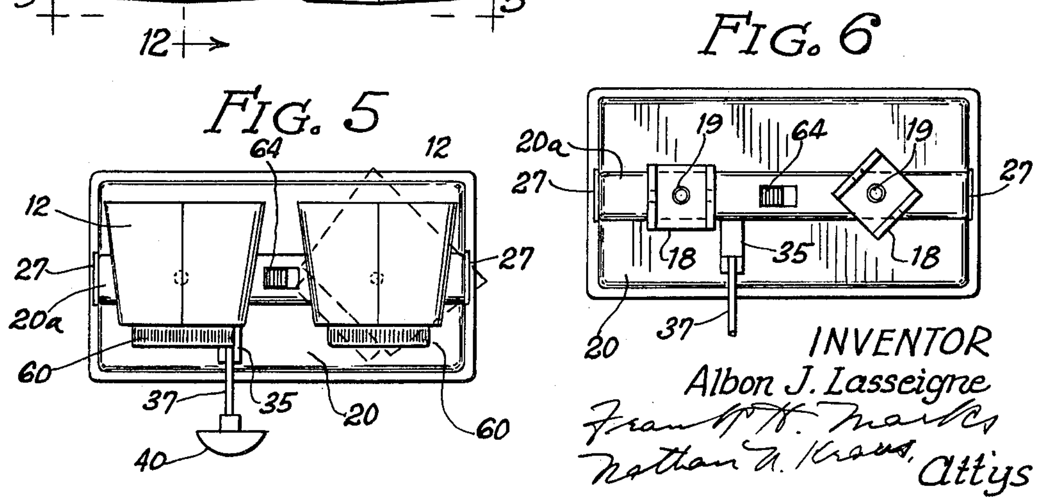
FIG. 5 is a plan view of the same device as seen from the opposite side, substantially along line 5—5 of FIG. 3.
FIG. 6 is a view similar to FIG. 5, showing the outside of the housing with the illuminating devices eliminated.

Referring first to FIGS. 1 and 2, reference character F represents a door frame leading to an inclosure such as a small room or closet the interior of which it is desired to illuminate automatically upon opening the door D thereto. In the instant case the door is shown as hung on frame F by suitable hinge or pintle means (not shown), permitting the door to swing on a vertical axis. However, my invention is not limited to such an arrangement but may be employed with equal success in connection with a sliding or other type of closure.

An improved illuminating device embodying my invention, indicated generally by numeral 10, comprises one or more reflector elements 12, which may take a wide variety of forms. In the instant case said reflector elements 12 each comprise a pair of similar molded pieces secured together as by adhesive to form a pyramidal lamp housing having a stem portion 15 which is bored and adapted to swivel on a bolt 16 retained by a thumb screw 17 and extending through the arms of a U-shaped trunnion 18. Said trunnion in turn is swivelly attached as by hollow rivet 19 on an axis transverse to bolt 16 to a main housing member 20. Thus, the light reflector 12 is mounted for universal pivotal movement.

Housing 20, in general, comprises a rectangular hollow box with a decorative marginal flange or head 21 and having a closure plate 25, the latter having at each end an integral ear 27 which normally extends through a slot 28 in the main housing 20 (FIG. 2). Such ears have enough resilience to be capable of being snapped in and out of slots 28 to lock cover 25 in place or remove same.

Cover plate 25 is provided with apertures 30, which may be in the form of a bayonnet slot or the like, for affixing the device by suitable means such as a screw or nail 32 to the door frame F (FIGS. 1 and 2).

Housing 20 serves as a container for a plurality of dry-cell batteries B which are retained by means of a suitable coil spring S in electrical engagement with contact points carried by a contact plate P.

Formed integrally with and extending longitudinally of housing 20 for the length thereof is a channel-shaped sub-housing **20*a*** which serves as a convenient receptacle for the electrical elements about to be described.

Formed on the outside of housing member 20 is a sleeve member 35 (FIGS. 2 and 12) through which passes a rod 37 to the outer or free end of which is fixed a generally spheroidal bumper member 40. On the inside of sub-housing **20*a* rod 37 carries a small boss 43 (FIGS. 8 and 12) formed of plastic or other electrically insulating material, abutting against a resilient switch leaf 45 of conductive material secured as by rivet 47 to an insulating bar 48. A boss 50 of insulating material fixed within sub-housing 20*a* opposite and axially aligned with stem 37 serves as a stop to limit the inward movement of said stem. Fixed on bar 48 in position to be engaged by switch leaf 45 is an electrical contact member 51** connected to the electrical circuit.

It is believed that it should be unnecessary to describe the electrical circuitry in detail. Suffice it to say that the circuit, which in this instance is in parallel, includes a lamp L in each of the reflector member 12, the batteries B and switch member 45. It will be obvious that the electrical circuit may take a variety of forms, my invention not being limited to any specific circuit.

Figures 7, 8, 9, 10, 11, 12, 13:
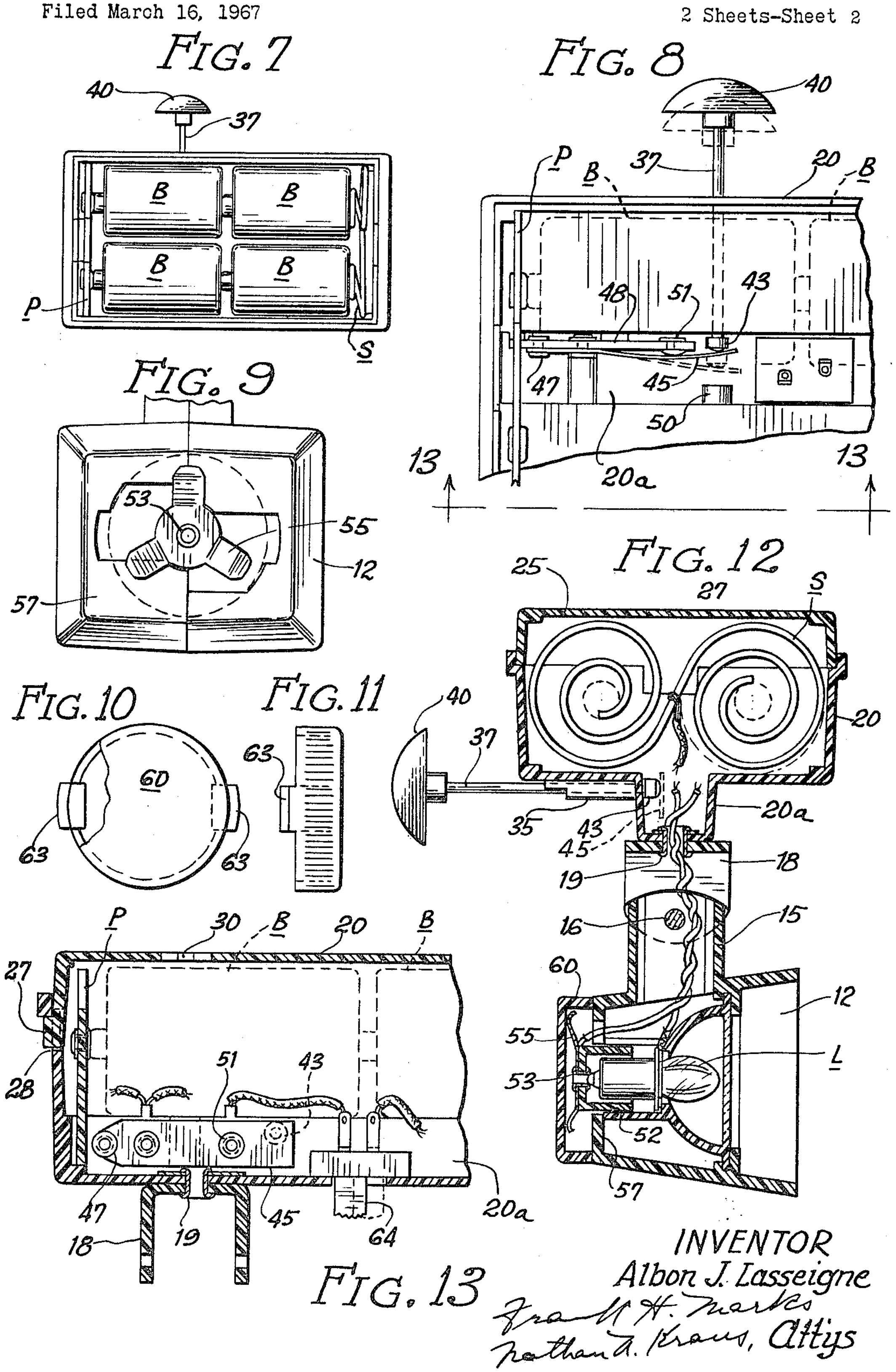
FIG. 7 is a plan view of the housing with the cover removed, showing part of contents.
FIG. 8 is a fragmentary plan view on a further enlarged scale showing a portion of the device as seen in FIG. 7, with batteries removed.
FIG. 9 is a further enlarged plan view of the base portion of one of the illuminating devices, with its protective cap removed.
FIG. 10 is a plan view of the aforesaid protective cap for one of the illuminating devices with a portion broken away.
FIG. 11 is a side elevational view of said cap.
FIG. 12 is a transverse sectional view, partly in elevation, showing switch control means and an illuminating element.
FIG. 13 is a fragmentary longitudinal sectional view taken substantially along the line 13—13 of FIG. 8.

In any event, the arrangement is such that when door D is closed, bumper 40 and stem 37 will be pressed inwardly to the position shown in dotted lines in FIGS. 2 and 8, maintaining leaf 45 out of engagement with contact member 50 and thus the electrical circuit open; accordingly, lamps L (FIG. 12) will not be illuminated.

When the door is opened, bumper 40 and stem 37 will be released and will be moved outwardly by resilient leaf 45, thus closing the circuit through said leaf and contact 51 and illuminating lamps L.

Referring to FIGS. 9 and 12, it will be noted that each of lamp bulbs L is seated within an insulating cup-like member 52 having an electrical contact member 53 fixed in the base thereof and secured to a star-like conductor member 55.

The pyramidal lamp housing 12 has a back plate 57 which is apertured (FIGS. 9 and 12), conductor member 55 being disposed outside of said back plate 57. A cap member 60 serves as a closure for the back of pyramidal housing 12, said cap 60 having a pair of diametrically opposite ears 63 (FIGS. 10 and 11) projecting therefrom and passing through the apertures in back plate 57 of housing 12. By making a short turn of cap 60, the ears 63 may be engaged against the inner face of the back wall 57 and yieldably clamped into position, the inner face of the cap engaging against star-like conductor member 55 and locking it and the lamp attached thereto firmly in position.

It will be understood that the other parts of the lamp assembly seen in FIG. 12 associated with lamp L, apart from cup 52 and star member 55, are fixed within lamp housing 12.

I also preferably provide a master control switch in series in the lamp circuit, controlled by a manually operable button 64 (FIGS. 3, 5, 6 and 13), which may be of any suitable type such as toggle, sliding, etc., although this feature is not indispensable.

Various changes coming within the spirit of my invention may suggest themselves to those skilled in the art; hence, I do not wish to be limited to the specific embodiment shown and described or uses mentioned, but intend the same to be merely exemplary, the scope of my invention being limited only by the appended claims. Thus, the parts shown and described as formed of molded plastic may conveniently be of stamped or pressed sheet metal.

I claim:

1. A self-contained portable battery-operated automatic illuminating device for an enclosure having a movable door, comprising (a) a main housing for receiving a plurality of dry cell batteries, (b) a lamp housing adjacent to said main housing containing an electric lamp and reflector therefor, (c) unitary means provided with an aperture for providing an internal wire passageway between said main housing and said lamp housing for interconnecting said main and lamp housings for universal movement relative to each other and to direct the light rays from said lamp into said enclosure in any desired direction, (d) electrical wires extending from the terminals of said lamp in said lamp housing, through said aperture, into said main housing, (e) an electric switch in said main housing connected in circuit with said wires and the terminals of said batteries, and (f) an actuator for said switch extending exteriorly of the main housing for opening the switch automatically in response to the movement of the door to its closed position, said actuator including spring biasing means for normally maintaining the switch in closed position to energize said lamp.

2. A device as set forth in claim 1, wherein said interconnecting means comprises (a) a U-shaped mounting bracket having a base and two substantially parallel arms extending transversely from the opposite ends of said base and provided with aligned openings, (b) a hollow rivet extending through the base of said bracket and a wall of said main housing for pivotally mounting said bracket to said main housing, said hollow rivet constituting said wire passageway and the pivotal axis, (c) a mounting lug, provided with an opening, extending from said lamp housing and disposed between said arms of said bracket, and (d) a pivot member extending through said aligned openings in the arms of said bracket and the opening in said mounting lug for pivotally mounting said first-mentioned pivotal axis.

3. A device as set forth in claim 1, including a second switch in said main housing connected in series with said first-mentioned switch including a manually operated element extending exteriorly of the housing to supplementally control the energization of said lamp independently of said actuator.

4. A device as set forth in claim 1, wherein said main and lamp housings and the mounting means therefor are formed of molded plastic material.

5. A self-contained portable battery-operated automatic illuminating device for an enclosure having a movable door, comprising (a) an elongate main housing for receiving a plurality of dry cell batteries end to end, (b) a pair of lamp housings adjacent to the opposite ends of said main housing, each containing an electric lamp and a reflector therefor, (c) unitary means provided with an aperture for providing an internal wire passageway between said main housing and each of said lamp housings for interconnecting each lamp housing with said main housing for universal movement relative to each other, to direct the light rays from said lamps into said enclosure in convergent or divergent beams of light, (d) electrical wires extending from the terminals of each lamp in each lamp housing through its respective aperture, into said main housing, (e) a manually operated switch in said main housing connected in circuit with said wires and terminals of said batteries to control selectively the energization and deenergization of said lamps, (f) a second electric switch in said main housing in series with said first switch, and (g) an actuator for said second switch extending exteriorly of the main housing for opening said last-mentioned switch automatically in response to the movement of the door to its closed position, said actuator including spring biasing means for normally maintaining the switch in closed position to energize said lamps when said first-mentioned manually operated switch is in closed position.

6. In an automatic illuminating device for an inclosure having a movable door, (a) a housing comprising a main housing and a sub-housing integral therewith, (b) said main housing being of elongate shape and of a size capable of containing a plurality of dry-cell batteries in tandem, (c) a movable lamp housing adjacent to said sub-housing containing an electric lamp and reflector therefor, (d) electric circuit means, including a switch, within said housing for energizing said electric lamp, with portions of said circuit means and said switch being disposed within said sub-housing, (e) unitary means connecting the lamp housing with the sub-housing providing substantially universal movement of the lamp housing and comprising an aperture for providing a passageway for an electrical conduit from the lamp housing to the sub-housing, and (f) an actuator for said switch extending exteriorly of said housing for opening the switch automatically in response to the movement of the door to its closed position, said actuator including spring biasing means for normally maintaining the switch in closed position to energize said lamp.

7. A combination as in claim 6, having a manually operable master switch in series with said first-mentioned switch, and operating means for said master switch accessible outside said housing.

References Cited

UNITED STATES PATENTS

| | | | |
|---|---|---|---|
| 640,729 | 1/1900 | Fenner | 240—6.4 |
| 2,279,933 | 4/1942 | Wells | 240—6.4 |
| 3,315,073 | 4/1967 | Araki | 240—81 X |
| 1,979,072 | 10/1934 | Kuntz | 240—2 X |
| 1,996,389 | 4/1935 | Smith | 240—10.61 |
| 2,119,267 | 5/1938 | Coleman | 240—2 X |
| 2,817,753 | 12/1957 | Corin | 240—2 X |

NORTON ANSHER, Primary Examiner

MONROE H. HAYES, Assistant Examiner

U.S. Cl. X.R.

240—6.4, 10.6

PO-1050
(5/69)

UNITED STATES PATENT OFFICE
CERTIFICATE OF CORRECTION

Patent No. 3,479,498 Dated November 18, 1969

Inventor(s) Albon J. Lasseigne

It is certified that error appears in the above-identified patent and that said Letters Patent are hereby corrected as shown below:

In Claim 2(d), Column 4, after line 21 and before line 22, insert -- lamp housing on an axis perpendicular to said --.

SIGNED AND
SEALED
APR 28 1970

(SEAL)
Attest:

Edward M. Fletcher, Jr.
Attesting Officer

WILLIAM E. SCHUYLER, JR.
Commissioner of Patents